March 7, 1933.   J. G. JONES   1,900,879
LIGHT TIGHT PHOTOGRAPHIC FILM CARTRIDGE
Filed July 27, 1929
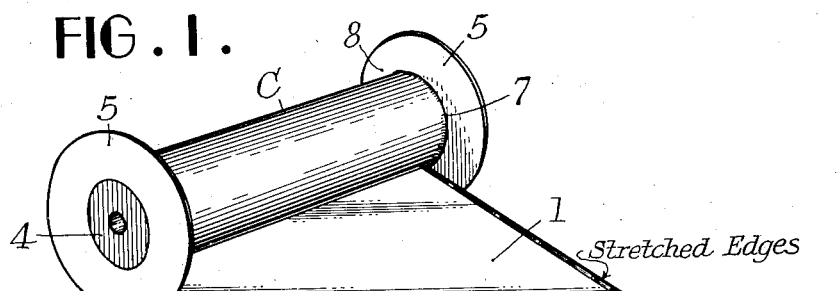
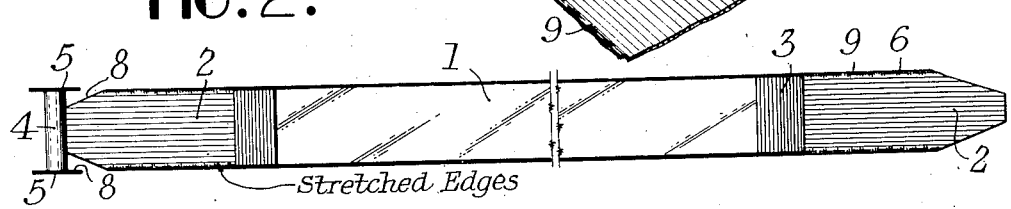
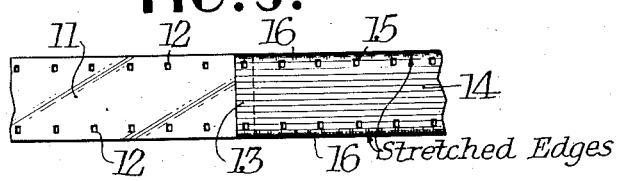
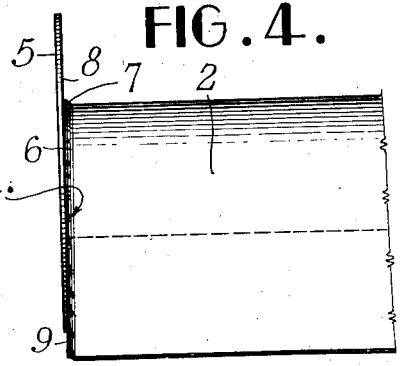
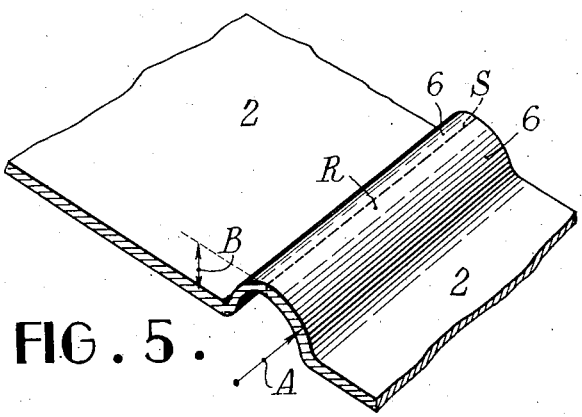
John G. Jones,
INVENTOR;
BY
ATTORNEYS.

Patented Mar. 7, 1933

1,900,879

UNITED STATES PATENT OFFICE

JOHN G. JONES, OF ROCHESTER, NEW YORK, ASSIGNOR TO EASTMAN KODAK COMPANY, OF ROCHESTER, NEW YORK, A CORPORATION OF NEW YORK

LIGHT TIGHT PHOTOGRAPHIC FILM CARTRIDGE

Application filed July 27, 1929. Serial No. 381,589.

This invention relates to photographic film cartridges in which strips of photographic film and a light protective covering are wound in convolutions upon a flanged spool. One object of my invention is to provide a protective covering for the film in which the longitudinal edges which normally contact with the film spool flanges are of greater length than the medial portion of the strip. Another object of my invention is to provide a film backing paper or protective covering having the edges stretched into a curved shape which both facilitates spooling the film and backing paper upon the flanged spool and reduces the possibility of light entering between the spool flanges and the backing paper. Another object of my invention is to provide a protective covering for the film which is easy to make and which can be readily kept within the desired limits of size. Still another object of my invention is to provide a protective covering for photographic film in which the edges are stretched to such an extent that the protective covering will lie in a smooth curve against the spool flanges while the medial portion of the strip lies flat against the supporting convolutions of film and paper. Other objects will appear from the following specification, the novel features being particularly pointed out in the claims at the end thereof.

A great deal of work has been done on the reduction of light fog by altering the protective covering for the film backing paper. In Patents Numbers 1,454,812—3—4—5—6—7, all issued May 8, 1923 to John G. Jones for photographic film cartridge, there are shown a number of methods of preventing light fog. These patents all relate to film backing papers in which the thickness of the protective covering is different between different areas of the covering. In some cases the edges of the film backing paper is made thinner than the medial portions thereof and in other cases the film backing paper edges are folded longitudinally of the strip.

This invention differs from the protective coverings shown in the above patents in that while the thickness of the film backing paper may be slightly reduced by the stretching operation there is not a very material change in the thickness of the backing paper and since it does not require a definite thinning of portions of the protective covering the difficulty of reducing the paper thickness in places is not present.

Coming now to the drawing wherein like reference characters denote like parts throughout:

Fig. 1 is a perspective view of the partially unrolled film cartridge constructed in accordance and embodying a preferred form of my invention;

Fig. 2 is a plan view of an unrolled film cartridge equipped with backing paper having stretched edges, the scale being broken;

Fig. 3 is a fragmentary plan view of a section of motion picture film having a leader strip provided with stretched edges;

Fig. 4 is a fragmentary end view on an enlarged scale of a film protective covering partially wound on a film spool; and Fig. 5 is a greatly enlarged perspective view of a section of the stretched backing paper before being slit.

The ordinary photographic film cartridge consists of a strip of film 1 which is protected by backing paper 2 to which the film may be attached by means of a suitable paster 3, the convolution of film and backing paper being wound on a spool having a core 4, and flanges 5.

In accordance with my invention the backing paper 2 is provided with a stretched edge 6. I prefer to stretch both edges of the film backing paper.

Because it is practically impossible to show in a drawing the way such a stretched backing paper actually looks, I have labelled in the drawing the edge as being "stretched edges", and have shown on a greatly enlarged scale a series of shade lines which are intended to indicate the curvature of the edge of the paper.

When the stretched edge backing paper is wound on a film spool the stretched edge lies in a smooth curve as indicated at 7, Fig. 1 against the inside 8 of the film spool. However, when the protective covering is drawn taut away from the spool the stretched edge will present a wavy appearance as indicated at 9 in Fig. 1.

It should be understood, however, that the magnitude of the stretched portion of the protective covering is so slight that by casually looking at a film cartridge equipped with this type backing paper it is hard to tell whether or not the edge is stretched. Close inspection will indicate, however, that the stretched edge turns up very slightly against the film spool flanges and when drawn out there is a slight wavy appearance due to the length of the edges of the backing paper being greater (because of the stretching) than the main portion of the sheet.

By holding the paper strip with one edge up and sighting along the edge the stretched edge is very noticeable although when lying flat the stretched edge is not nearly so apparent. In order to give a little idea of the size of the stretched edge reference may be had to Fig. 5 wherein the dimensions A and B indicate a preferred dimension for the stretching operation.

A, which is the radius of curvature, may be approximately .5" and B, which is the height of the stretched portion above the plane surface of the backing paper sheet 2 may be .020". I preferably cut the film protective paper .010" wider than the distance between the film spool flanges. These may normally vary plus or minus .004". It is to be understood that these dimensions are purely by way of illustration and that successful stretched edge backing paper may be made by widely varying the dimensions of the ridge R which is stretched into the sheet.

The paper is normally stretched in wide sheets by drawing it tightly over rollers having a plurality of ridges of the desired dimension and at the desired spacing thereon. By drawing the paper tightly around a roller so shaped the ridges R are stretched into the sheet while the paper is in a curved position. This causes the stretched edges of the sheet to lie smooth and snug against the film spool flanges when the backing paper is coiled on the core.

After stretching the wide sheet of paper so that a plurality of small ridges extend through the length of the sheet these ridges may be slit along the line S, Fig. 5 so that each edge of the film backing paper is provided with an arcuate curved edge 6. Of course, the paper may be slightly thinned by the stretching operation but since the paper is changed from its normal shape by stretching and not by abrading or cutting there is not a great reduction in the thickness along the edges and there is an upwardly curved arc which permits the paper to wind smoothly to and from the film spools.

For instance as indicated in Fig. 4 the stretched edge 6 is shown on a considerably exaggerated scale. It will be noticed that the slightly wrinkled edge indicated by the shade lines at 9 gradually smooths out as it approaches the curvature of the convolution C of film and paper which are coiled about the film core 4. The fact that the backing paper 2 will have slightly wrinkled edges when the paper is drawn out behind the film in a camera for exposure is immaterial because this wrinkling is very slight and exists only at the extreme edges of the backing paper so that the usual springs and film tension pads in photographic cameras can function exactly as they always do.

For motion picture film and particularly for the amateur size of motion picture film which is coiled in convolutions on a film spool with a leader and sometimes a tail strip of protective covering, the stretched edge backing paper is also useful. In Fig. 3 the film 11 may carry perforations 12 and may be attached at 13 to a protective covering 14 having apertures 15, the edges 16 which are shaded are stretched edges although the magnitude of the stretching indicated in the drawing is greatly magnified since the actual stretched portion is of very small dimension.

As in the case of the roll film cartridge shown and described in Fig. 1 stretched edge 16 wrinkles slightly when drawn out flat as shown in Fig. 3 but when coiled upon a suitable film spool these wrinkles flatten out to form a curved surface which lies snugly against the flanges of the film spools and is effective to prevent light from leaking down between the convolutions of paper and film and the film spool flanges.

In the specification and claims the words "smooth" or "smoothly" are intended to cover the stretched edges of my backing paper either in a flat, slightly wavy condition or in the smooth condition which is caused by winding the film backing paper upon a spool. In both cases the stretched edges are smooth in that they are free from any corrugations or permanently formed configurations as might be formed by embossing rollers.

Having thus described my invention, what I claim as new and desire to secure by Letters Patent is:

1. A protective covering for photographic light sensitive film comprising a strip of protective paper having the longitudinal edges thereof smoothly stretched thereby having a slightly wavy edge when unrolled.

2. A protective covering for photographically light sensitive film comprising a strip of protective paper having the longitudinal edges thereof smoothly stretched into an arcuate shape in cross section thereby having a slightly wavy edge when unrolled.

3. A protective covering for photographically light sensitive film comprising a strip of paper adapted to be interwound on a spool with the film, the longitudinal edges of said strip being smoothly stretched whereby said edges may lie in a smooth even curve when coiled upon a spool, and may lie in a slightly wavy condition when the paper is unrolled.

4. A photographic film cartridge comprising coiled strips of sensitized material, and convolutions of protective material interwound therewith, the edges of the protective material being smoothly stretched whereby the edges are of greater length than the medial portion of the strip thereby causing said film protective material to have a slightly wavy edge when unrolled.

5. As an article of manufacture, comprising a spool with end flanges, bands of light sensitive film and of protective paper wound thereon, the protective paper band having smoothly stretched edges adapted to contact and lie smoothly against the flanges of the spool and adapted when unrolled to have a slightly wavy edge.

6. A protective covering for photographic light-sensitive film comprising a protective paper having the edges thereof stretched longitudinally of the strip and presenting a smooth curved surface.

7. A photographic film cartridge comprising coiled strips of sensitized material, and convolutions of protective material interwound therewith, the edges of said protective material being smoothly stretched into a greater length than the remainder of the protective paper thereby having a slightly wavy edge when unrolled.

Signed at Rochester, New York this 22nd day of July 1929.

JOHN G. JONES.